United States Patent

[11] 3,590,861

| [72] | Inventors | George Edward Chittenden;<br>George Park Ferguson MacNeill, both of<br>Coventry, England |
|---|---|---|
| [21] | Appl. No. | 841,957 |
| [22] | Filed | July 15, 1969 |
| [45] | Patented | July 6, 1971 |
| [73] | Assignee | Keelavite Hydraulics Limited |
| [32] | Priority | May 5, 1969 |
| [33] | | Great Britain |
| [31] | | 22817/69 |

[54] LIQUID FLOW CONTROL VALVES
5 Claims, 12 Drawing Figs.

[52] U.S. Cl. .................................................. 137/501,
  137/504
[51] Int. Cl. .................................................. G05d 7/01
[50] Field of Search ..................................... 137/504,
  501; 251/208

[56] References Cited
UNITED STATES PATENTS

| 1,055,291 | 3/1913 | Richardson | 137/504 X |
| 1,467,522 | 9/1923 | Amsler | 137/501 |
| 2,628,588 | 2/1953 | Mehler | 251/208 X |
| 2,845,087 | 7/1958 | Thomas | 137/504 |
| 2,923,277 | 2/1960 | Waterman | 251/208 X |
| 3,100,620 | 8/1963 | Kates | 137/501 X |
| 3,223,115 | 12/1965 | Kates | 137/501 |

FOREIGN PATENTS

| 738,362 | 7/1966 | Canada | 137/501 |
| 1,016,432 | 11/1952 | France | 137/501 |

*Primary Examiner*—M. Cary Nelson
*Assistant Examiner*—R. B. Rothman
*Attorney*—Watson, Cole, Grindle & Watson ABSTRACT: A pressure-compensated liquid flow metering valve which comprises, arranged in the same bore, a variable orifice afforded by a port obturated by the skirt of a piston biased in a direction to open the port by a spring and an adjustable fixed orifice through which hydraulic fluid from the inlet flows to the same side of the piston as the spring. Inlet pressure acts on the other side of the piston. Thus the variable orifice is automatically varied to maintain a constant pressure drop across and hence a constant flow through the fixed orifice. The fixed orifice may be in the crown of the piston and adjustable by a plate movably mounted on the crown or may be a plate valve extending across the bore.

INVENTORS
GEORGE EDWARD CHITTENDEN
GEORGE PARK FERGUSON MACNEIL
BY
Watson, Cole, Grindle & Watson
ATTORNEY

LIQUID FLOW CONTROL VALVES

This invention relates to liquid flow control valves of the pressure-compensated metering type. These valves are employed to produce a substantially constant rate of flow independent of the pressure of the liquid flowing through them and may be used, for example, to produce a constant speed of operation of a ram or motor independently of the load on the ram or motor. Such valves operate by passing the flow through two orifices in series, one orifice being fixed and the other being variable to maintain a sensibly constant pressure drop across the fixed orifice and thus a constant rate of flow through the fixed orifice. In one form of such valve already proposed the variable orifice is provided by spool valve and the fixed orifice is located separately from the spool valve, the pressure upstream of the fixed orifice being applied to one end of the spool and the pressure downstream together with the force of a spring being applied to the other end. With this arrangement the spool adjusts its position and hence the degree of opening of the variable orifice to maintain the pressure drop across the fixed orifice at the constant value determined by the strength of the spring. Although one orifice is described as fixed this term is used only to contrast this orifice with the variable orifice which varies automatically during operation to produce the required pressure drop across the fixed orifice. In fact, the so-called fixed orifice may be adjustable to adjust the constant rate of flow through the valve to a different desired value or to provide a permanent adjustment to the setting of the valve.

The arrangement in which the variable orifice and the fixed orifice are afforded by separate units is both bulky and expensive.

According to the present invention, a pressure-compensated liquid flow metering valve comprises a bore containing a piston controlling an exit port, a spring biasing the piston in a direction to open the port, an inlet to the bore leading directly or indirectly to the side of the piston opposite the port so as to apply inlet pressure to the piston in a direction to close the port, a communication between a part of the bore at inlet pressure and the part of the bore from which the port opens, and adjustable valve means located within the bore for adjusting the flow through the communication independently of the movement of the piston along the bore.

With this construction the variable orifice afforded by the piston-controlled port and the adjustable fixed orifice afforded by the adjustable valve means are arranged in a common bore and the valve therefore forms a single compact unit.

The communication may be constituted by at least one orifice through the piston and the adjustable valve means may comprise means carried by the piston for adjustably presetting the size of the orifice, the surfaces defining the orifice being carried solely by the piston. In this case the presetting means may comprise a plate movably secured to the counterelement constituted by the crown of the piston for movement in a plane perpendicular to the axis of the piston for obturation of the orifice. On the other hand, the adjustable valve means may be constituted by a fixed plate extending across the bore and having at least one adjustable orifice therein. In one such arrangement the inlet opens into the bore between the piston and the fixed plate and the said communication includes a passage leading from the other side of the fixed plate to the bore on the side of the piston remote from the fixed plate. In another arrangement, the side of the fixed plate remote from the piston and the side of the piston remote from the fixed plate are both in communication with the inlet. In each of the last two arrangements the fixed plate may constitute a counterelement to which a movable plate is secured for movement in a plane parallel with the plane of the fixed plate for adjustment of the orifice therethrough.

In any of the constructions in which the fixed orifice includes a movable plate for adjusting the fixed orifice, the movable plate is preferably formed with an opening having a pair of sides which converge to an apex and arranged so that movement of the movable plate relative to the counterelement causes the opening progressively to uncover the orifice commencing from the apex. Although the opening may take various forms it is preferably in the form of a V-notch. The notch may be formed in the side of an orifice through the plate or may be formed in an outer edge of the plate. It will be realized that a V-notch in an outer edge of the plate can easily machined both cheaply and accurately. When the opening is in the form of a notch in an outer edge it will not, of course, be completely circumscribed by the plate. The plate may be rotatably secured but alternatively may slide rectilinearly.

It has been found that the described form of opening in the movable plate has a low susceptibility to clogging. This is believed to be due, at least in part, to the fact that even shortly after the opening has begun to uncover the orifice and when the cross-sectional area of the opened flow passage is still small, the minimum transverse dimension of the said passage will be comparatively large compared with the cross-sectional area of the passage.

In the arrangement having a plate valve mounted in the bore, this valve represents the fixed orifice across which the pressure drop is maintained constant. It can be adjusted either to provide an initial adjustment so that the metering valve may be calibrated after manufacture or the plate valve may be so constructed that it can be adjusted from outside the metering valve either to provide a subsequent semipermanent modification to the characteristics of the metering valve or to provide a continuous modulation where this is required.

In all the arrangements having movable plates adjusting the size of orifices, the plate is preferably mounted on the upstream side of the counterelement so that the pressure drop holds the plate firmly against the counterelement to reduce leakage.

In the arrangement in which there is an orifice in the piston, the piston may be generally cup-shaped so as to have a crown and a skirt, the orifice being formed in the crown and the skirt obturating the port which if formed in the cylinder in which the piston moves. With this arrangement the skirt provides a convenient guide for the spring, one end of which butts on a fixed portion of the cylinder such as one end thereof.

While it is possible for the piston to have only a single orifice, better flow characteristics may be obtained if there are a number of orifices which should preferably be distributed symmetrically about the axis of the piston. Similarly there may be a number of exit ports distributed around the circumference of the cylinder.

The means for adjustably presetting the size of the orifice make it possible to adjust a number of valves to ensure that they have closely similar and predetermined flow characteristics. The presetting means may take various forms but preferably comprises an obturator in the form of a plate which is rotatably secured to the crown of the piston as, for example, by being connected thereto by a screw. Thus the size of the orifice maybe adjusted by rotating the plate so that a selected part of the orifice is obturated by the plate and the screw may then be tightened. In one example the crown of the piston has a number of orifices symmetrically distributed around a pitch circle and the plate is attached to the crown by a screw which is coaxial with the piston, the plate having holes which are identical with those through the crown of the piston. In other arrangements more delicate adjustment can be achieved by having edges on the obturator plate which are nonsymmetrical about the axis of rotation. Preferably, the plate is secured to the upstream face of the piston crown so that fluid pressure tends to press the plate against the piston.

The invention may be carried into practice in various ways and a number of pressure compensated liquid flow metering valves embodying the invention and a number of alternative pistons therefore will now be described by way of example with reference to the accompanying drawings, in which.

Figure 1:
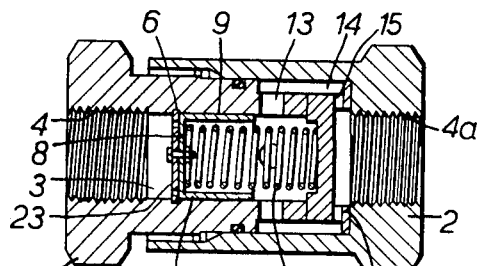
FIG. 1 is a longitudinal section through one form of metering valve.

The valve shown in FIG. 1 comprises a cylinder consisting of two portions 1 and 2 which can be screwed together to afford a bore 3. The valve may be connected in a liquid flow line by internal screw threaded bores 4 and 4a. The bore 3 forms a cylinder chamber in which a piston 5 is free to reciprocate. The travel the piston to the left in FIG. 1 is limited by an internal circlip 6 carried by a groove in the housing portion 1 and the piston is biased towards the circlip by a compression spring 7. The piston is cup-shaped and has a crown 8 and a skirt 9. The spring 7 is guided by the skirt and one end engages the inner surface of the crown 8. The other end bears against an end plate 11 which is clamped between the two portions 1 and 2 of the valve. There are four exit ports 13 distributed around the circumference of the portion 1 of the valve, these ports leading to a gallery 14 formed between the portion 2 of the valve on the one hand and the portion 1 and the end plate 11 on the other hand. There are passages 15 through the end plate 11 interconnecting the gallery 14 with the threaded outlet bore 4a in the portion 2.

Figure 2:
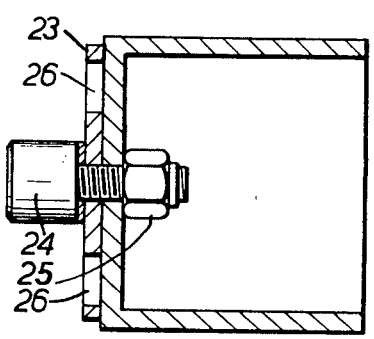
FIG. 2 is a longitudinal section to a larger scale through the piston of the valve shown in FIG. 1.
Figure 3:
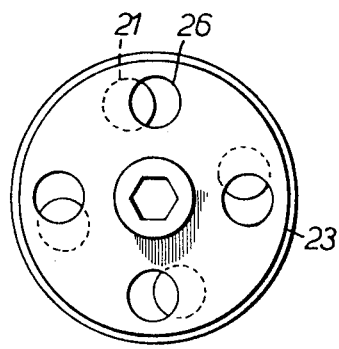
FIG. 3 is an end elevation of the piston shown in FIG. 2.

As can be seen from FIGS. 2 and 3, the piston has four circular straight-edged orifices 21 evenly distributed about the axis of the piston. An obturator plate 23 is secured to the head of the piston by a bolt 24 and a nut 25. The plate 23 has four circular straight-edged orifices 26 corresponding in size and location to the orifices 21. It will be realized that before the valve is assembled the plate 23 is rotated to provide the required degree of exposure of the orifices 21 through the orifices 26 and the nut an bolt 24 and 25 are then tightened up. If the flow is found to be incorrect the valve can be disassembled and the plate 23 readjusted.

The valve operates as follows. Hydraulic fluid from, for example, a constant delivery pump is admitted through the bore 4 and the inlet pressure is applied to the outer surface of the piston crown 8. The fluid passes through the orifices 21, 26 to the interior of the piston and passes out through the exit ports 13, the gallery 14, passages 15 and the discharge bore 4a to a point of use such as a ram or other hydraulic motor. A pressure drop develops across the orifices 21, 26 and the lower pressure operates on the downstream side of the piston together with the force exerted by the spring 7. If the pressure drop rises, the piston moves to the right in FIG. 1 and the exit ports 13 are partially obturated by the skirt of the piston 5 so that the flow through the orifices 21, 26 drops until the pressure drop across them is restored to its desired value. Similar adjustments in the opposite direction occur if the pressure drop across the orifices falls. Thus the valve tends to maintain a constant pressure drop and consequently a constant rate of flow through the orifices 21, 26 irrespective of the absolute value of the inlet pressure.

The construction of valve shown in FIGS. 1 to 3 may be modified by replacing the piston 5 with one of the four alternative pistons shown in FIGS. 4 to 7.

Figure 4:
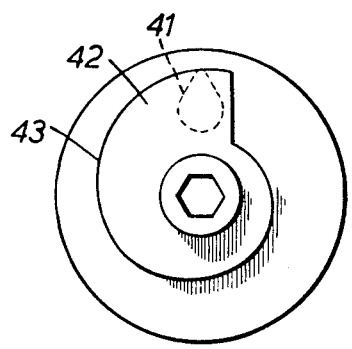
FIGS. 4, 5, 6 and 7 are end elevations of four further forms of piston.
Figure 5:
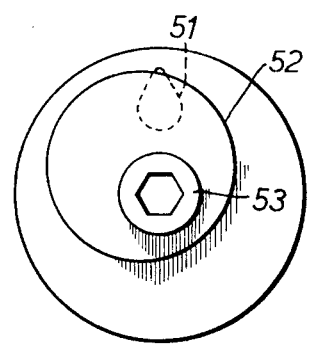

In the piston shown in FIG. 4, the crown has a single pear-shaped orifice 41 and the obturator plate 42 has a spiral outer edge 43. With this arrangement a comparatively large angular rotation of the plate produces a comparatively small change in the exposed area of the orifice 41 so that delicate adjustment is possible. Delicate adjustment is also possible with the piston shown in FIG. 5 which also employs a pear-shaped orifice 51 but uses a circular obturator plate 52 which is mounted eccentrically on the bolt 53.

Figure 6:
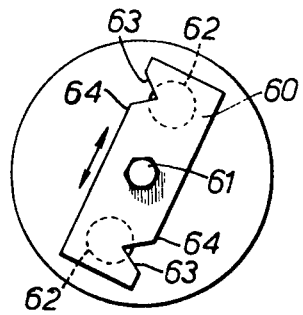

The obturator plate 60 shown in FIG. 6 is attached to the crown of the piston in the same way as the plate 23 shown in FIGS. 1 to 3 and is similarly attached by a bolt 61 to the crown of the piston which in this case has two diametrically opposite circular straight-edged orifices 62. Opposite edges of the plate 60 are formed with V-notches 63 in positions such that when the plate is rotated as indicated by the arrow 64 the apexes of the notches pass approximately through the axes of the orifices 62. It will be understood that the amount of the orifices 62 exposed by the plate 60 can be adjusted by rotation of the plate so that a greater or lesser proportion of the notches 62 overlap the orifices 62. If required, the plate may be rotated to a position where the side edges 65 alongside the notches 63 overlap the orifices to expose a greater proportion of the orifices than the area of the notches alone.

Figure 7:
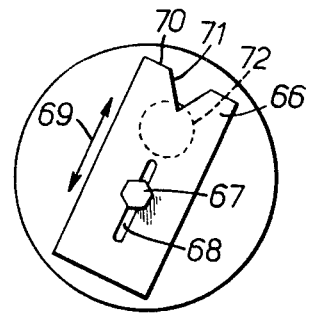

In the construction shown in FIG. 7, the obturator plate 66 is secured to the piston crown by a bolt 67 passing through a slot 68 in the plate and can therefore slide rectilinearly along a diameter of the piston crown as indicated by the arrows 69. In this case and an edge 70 of the plate carries a V-notch 71 and a greater or lesser proportion of the single orifice 72 in the piston crown can be exposed by movement of the plate.

In other respects the construction and operation of the valve is the same as that of the valve shown in FIGS. 1, 2 and 3.

Figure 8:
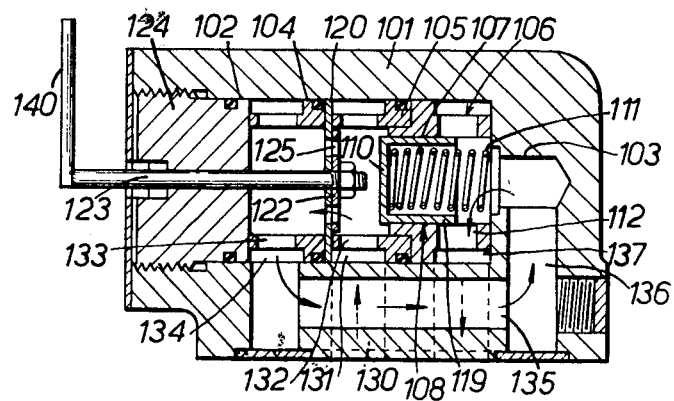
FIG. 8 is a longitudinal section through a second form of metering valve.
Figure 9:
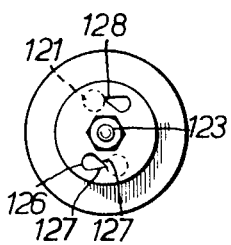
FIG. 9 is an end elevation of the plate valve of the metering valve shown in FIG. 8.

The valve shown in FIGS. 8 and 9 comprises a housing 101 having a blind bore 102 formed with a short counterbore 103. The bore contains three sleevelike spacers 104, 105 and 106 each of which is formed with radial ports communicating with a circumferential gallery.

The spacer 106 is formed with radial ports communicating with a circumferential gallery.

The spacer 106 is formed with a bore 107 in which reciprocates a piston 108 having a skirt 109 and a crown 10, the skirt serving to obturate radial ports 112 formed in the spacer 106. The piston is biased to the left as viewed in the drawing by a compression spring 111.

A disc 120 is clamped between the spacers 104 and 105. As can be seen from FIG. 9 the disc is formed with circular apertures 121 and has a central hole 122 in which is journaled a shaft 123 which is also guided in a closure plug 124 which seals the open end of the bore 102. On the inner end of the shaft 123 there is a valve plate 125 which is formed with approximately pear-shaped apertures 126 as can be seen in FIG. 9 These apertures are formed with edges 127 which converge to an apex 128.

Extending through the housing 101 is an inlet passage 130 which leads into a gallery 131 formed in the spacer 105. The radial ports 132 in the spacer lead into the bore between the plate valve formed by the disc 120 and the plate 125 and the crown 110 of the piston 108. The spacer 104 has radial ports 133 which lead to a gallery 134 which communicates with a passage 135 in the housing which extends alongside the bore 102 and communicates with a radial passage 136 leading into the counterbore 103. The exit ports 112 in the spacer 106 lead into a gallery 137 in this spacer which communicates with a radial exit passage 138 in the housing.

Operation of the valve is as follows. Hydraulic fluid is admitted to the space between the valve plate 125 and the piston 108 and passes through the plate valve whence it passes through the passage 135 to the other side of the piston 108. The fluid then leaves the bore through the exit ports 112 and the exit passage 138. The piston 108 adjusts its position and hence the cross-sectional area of the exit ports 112 automatically to maintain a constant pressure drop cross the piston and hence across the plate valve.

The cross-sectional area of the flow passage through the plate valve can be adjusted by rotating the valve plate 125. This may be achieved by means of a lever 140 which may either afford a permanent calibration adjustment or may be attached a control unit of the plant in which the valve is included to provide continuous modulation.

Figure 10:
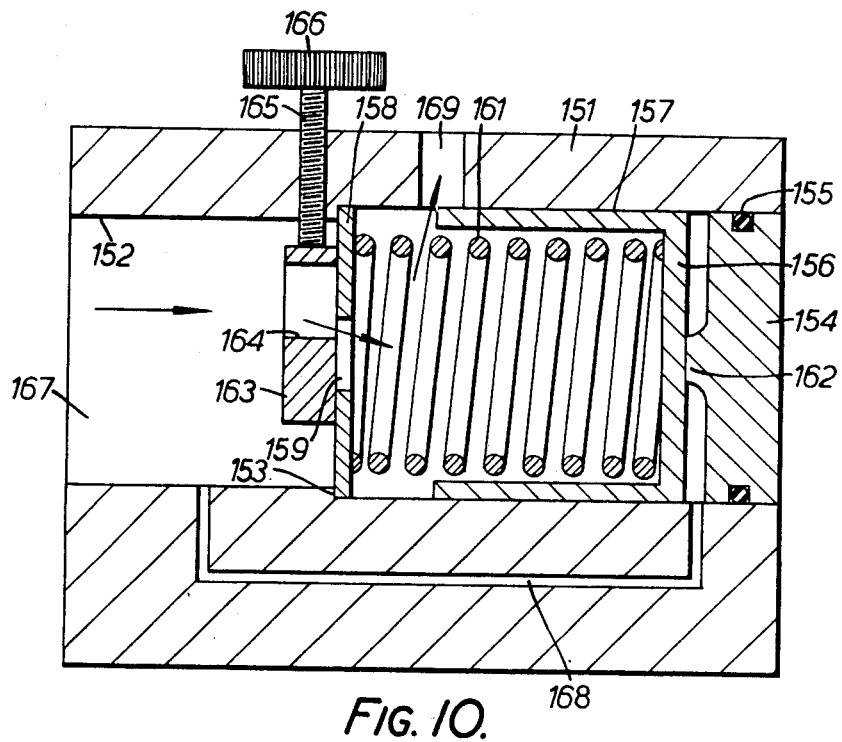
FIG. 10 is a longitudinal section through a third form of metering valve.
Figure 11:
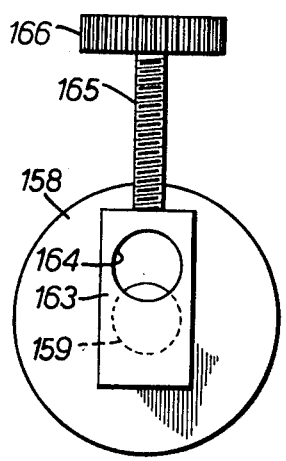
FIG. 11 is an end elevation on an adjustable orifice in the valve shown in FIG. 10.

The valve shown in FIGS. 10 and 11 includes a sleeve like housing 151 having a bore 152 formed with a shoulder 153 and closed at one end by a plug 154 which is sealed in the bore 152 by means of an O-ring 155. The larger diameter portion of the bore 152 contains a piston having a crown 156 and a skirt 157. Abutting the shoulder 153 is a valve plate 158 having a central circular sharp edged orifice 159. A compression coil spring 161 has one end abutting the side of the valve plate 158 opposite to that engaging the shoulder 153 and the other end abutting the inner side of the piston crown 156. This biases the piston towards engagement with a protrusion 162 on the plug 154. Mounted to slide on the valve plate 158 is a valve closure member 163 having a circular sharp edged orifice 164 adapted to obturate the central circular sharp-edged orifice 159. The valve plate 163 can be moved to vary the size of the opening through the valve plate by means of a threaded shaft 165 carrying a knurled disc 166.

The end of the bore opposite to that containing the plug 154 forms an inlet chamber 167 which is in communication with the chamber formed at the opposite end of the piston by means of a passage 168. There is an outlet port 169 formed in the housing wall 151 in a position to be obturated the skirt 157 of the piston.

The valve shown in FIGS. 10 an 11 operates in a similar manner to the valves previously described. Thus inlet pressure is applied to the crown of the piston, via the passage 168, in a direction tending to move the piston in a direction to close the outlet port 169 while the pressure downstream of the adjustable fixed orifice afforded by the plate 158 and the valve member 163 together with the force of the spring 161 tends to move the piston in the opposite direction.

Figure 12:
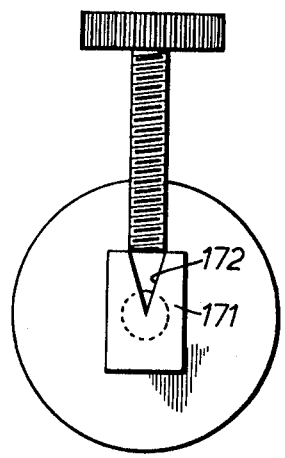
FIG. 12 is an end elevation similar to FIG. 11 showing an alternative form of adjustable orifice.

The circular orifices in the valve plate 158 and the valve member 163 clearly shown in FIG. 11 are suitable for large flows. For small flows greater sensitivity of adjustment can be obtained by substituting a valve member 171 as shown in FIG. 12. This valve member has a V-shaped notch 172 in place of the circular orifice 164.

We claim:

1. A pressure-compensated liquid flow metering valve comprising: a straight bore; an adjustable valve constituted by a fixed plate extending across the bore and having at least one adjustable orifice therethrough; a piston slidable within the bore and controlling an exit port in the wall of the bore on the side of the piston remote from the fixed plate; a spring biasing the piston towards the fixed plate; an inlet in the wall of the bore between the piston and the fixed plate; and a passage leading from the bore on the side of the fixed plate remote from the piston to the bore on the side of the piston remote from the fixed plate.

2. A valve according to claim 1 wherein a movable plate is secured to the fixed plate for movement in a plane parallel with the plane of the fixed plate for adjustment of the orifice therethrough.

3. A valve according to claim 2 wherein the movable plate is formed with an opening having a pair of sides which converge to an apex and arranged so that movement of the movable plate relative to the counterelement causes the opening progressively the uncover the orifice commencing from the apex.

4. A valve according to claim 3 wherein the opening is in the form of a V-notch.

5. A valve according to claim 4 wherein the notch is formed in an outer edge of the plate.